(12) United States Patent
Abe et al.

(10) Patent No.: US 9,037,275 B2
(45) Date of Patent: May 19, 2015

(54) PLAYBACK SPEED CONTROL APPARATUS AND PLAYBACK SPEED CONTROL METHOD

(75) Inventors: Koichi Abe, Kobe (JP); Shogo Tsubouchi, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 928 days.

(21) Appl. No.: 13/132,889

(22) PCT Filed: Nov. 27, 2009

(86) PCT No.: PCT/JP2009/006413
§ 371 (c)(1),
(2), (4) Date: Aug. 17, 2011

(87) PCT Pub. No.: WO2010/064391
PCT Pub. Date: Jun. 10, 2010

(65) Prior Publication Data
US 2011/0295395 A1   Dec. 1, 2011

(30) Foreign Application Priority Data

Dec. 3, 2008   (JP) ................................. 2008-308157

(51) Int. Cl.
    G06F 17/00   (2006.01)
    G11B 19/28   (2006.01)
    G11B 19/02   (2006.01)
    G11B 19/26   (2006.01)

(52) U.S. Cl.
    CPC .............. *G11B 19/28* (2013.01); *G11B 19/022* (2013.01); *G11B 19/26* (2013.01)

(58) Field of Classification Search
    USPC .............. 700/94; 381/119; 345/684; 715/830
    See application file for complete search history.

(56) References Cited

U.S. PATENT DOCUMENTS

| 6,965,723 B1 | 11/2005 | Abe et al. |
| 2005/0068867 A1* | 3/2005 | Usui ........................... 369/47.32 |
| 2007/0195665 A1* | 8/2007 | Iida .............................. 369/47.1 |
| 2010/0271401 A1* | 10/2010 | Fong ............................. 345/660 |

FOREIGN PATENT DOCUMENTS

| EP | 0586247 | 3/1994 |
| JP | 61203436 A | 9/1986 |
| JP | 61208657 | 9/1986 |
| JP | 01035761 | 2/1989 |
| JP | 3017850 A | 1/1991 |

(Continued)

OTHER PUBLICATIONS

International Search Report for International Application No. PCT/JP2009/006413, mailed Mar. 11, 2010, 2 pages.
International Preliminary Report on Patentability dated Jun. 7, 2011 and Written Opinion dated Mar. 11, 2010 regarding PCTJP2009006413.

(Continued)

*Primary Examiner* — Joseph Saunders, Jr.
(74) *Attorney, Agent, or Firm* — Arent Fox LLP (57) ABSTRACT

A playback speed control apparatus, which controls playback speed according to rotation of an operation unit (15) that is rotatable, includes: a rotation speed detection unit (15c) that detects rotation speed of the operation unit; and a control (291) unit that controls the playback speed according to the rotation speed detected by the rotation speed detection unit, in which the control unit either increases or decreases the playback speed according to a recursive pattern of the rotation speed detected by the rotation speed detection unit.

12 Claims, 6 Drawing Sheets

(56) References Cited

FOREIGN PATENT DOCUMENTS

| | | |
|---|---|---|
| JP | 4038743 A | 7/1992 |
| JP | 6150469 A | 5/1994 |
| JP | 1092057 A | 4/1998 |
| JP | 2005174456 A | 6/2005 |

OTHER PUBLICATIONS

International Publication No. WO2010/064391-A1 dated Jun. 10, 2010 regarding PCT/JP2009/006413.
Notice of Reasons for Rejection dated Dec. 3, 2013 regarding Japan Application No. JP2011-524079.

* cited by examiner

PLAYBACK SPEED CONTROL APPARATUS AND PLAYBACK SPEED CONTROL METHOD

CROSS-REFERENCE TO RELATED APPLICATIONS

This application is a United States National Stage Application under 35 U.S.C. §371 of International Patent Application No. PCT/JP2009/006413, filed Nov. 27, 2009, which claims the benefit to Japanese Patent Application No. 2008-308157, filed Dec. 3, 2008, each of which is incorporated by reference into this application as if fully set forth herein.

TECHNICAL FIELD

The present invention relates to a playback speed control apparatus and a playback speed control method for controlling a playback speed of recorded video data or audio data according to rotation of an operation unit.

BACKGROUND ART

Jog dials are commonly used as an interface of a controller that operates to control playback positions of video data or sound data in searching for a desired playback position of video or sound while playing recorded video or sound data and looking at video or listening to sound (see Patent Document 1, for example). A jog dial is configured to move the playback position according to a rotational position of a dial as an operation unit operated by a rotating operation. The jog dial is an interface that can be easily operated in an intuitive manner, and while it is convenient when a playback position of intended video or sound is temporally close to a current playback position, it is not suitable for a case in which the playback position of the intended video or sound is temporally far from the current playback position, as it is necessary to continue the rotating operation for a while.

Therefore, many jog dials that are conventionally used are provided with, in addition to a normal "jog mode" for moving a playback position according to a rotation speed at which the jog dial is rotated, a "shuttle mode" for changing the playback speed according to an angle at which the jog dial is twisted, and are configured such that the playback speed is increased by rotating the dial after switching to the shuttle mode when the playback position of the intended video or sound is temporally far from the current playback position.

However, there is a problem in that, when such a conventional jog dial is in the shuttle mode, if the jog dial is operated assuming that it is in the jog mode by mistake, the playback speed is increased to a large degree and the playback position is moved far away from the intended position, thus consuming excessive time and effort to move the playback position back to the original position. This is critical when time is limited, especially in such a case when preparing replay in a live sport broadcast.

There is still an additional problem in that, in the shuttle mode, unlike the jog mode, the playback position can be overly moved before stopping the playback, since it is necessary to rotate the dial to adjust to a stop position or to press a stop button between when a video image is found and when the playback is stopped.

While there is a product that allows access to both functions at the same time by providing a ring for shuttle operation outside of the jog dial, this adversely limits a hand position on the jog dial, since it is not possible to place the hand on the side of the jog dial due to the ring. There is another product with which an amount and the speed of rotation of the jog dial can be switched by buttons, but this adversely takes time and effort in switching of the buttons.

There is also a product that can increase the speed by continuing rotation of the jog dial (see Patent Document 2, for example). However, this can turn out to be more inconvenient in some cases, since the speed may be unintentionally increased when intending a preview playback at a constant speed.

CITATION LIST

Patent Literature

PTL 1: Japanese Unexamined Patent Application Publication No. H10-92057
PTL 2: Japanese Unexamined Patent Application Publication No. H06-150469

SUMMARY OF INVENTION

Technical Problem

As described above, although the jog dial has superior operability when the desired playback position of the intended video or sound (or both of these) is temporally close to the current playback position of the intended video or sound, in a case in which the desired playback position is temporally distant from the current playback position, it is adversely necessary to either continue the rotating operation of the jog dial, or to change the operation mode of the jog dial consuming time and effort, and is thus inconvenient.

The present invention was conceived to solve the existing problems mentioned above, and it is an object of the present invention to provide a playback speed control apparatus and a playback speed control method, with which an intended playback position can be easily found regardless of a current playback position of an intended video or sound without impairing operability and promptness of a jog dial while preventing erroneous operation.

Solution to Problem

According to a first aspect of the present invention, a playback speed control apparatus is provided that controls playback speed according to rotation of an operation unit which is rotatable, the apparatus including: a rotation speed detection unit that detects rotation speed of the operation unit; and a control unit that controls the playback speed according to the rotation speed detected by the rotation speed detection unit, in which the control unit either increases or decreases the playback speed according to a recursive pattern of the rotation speed detected by the rotation speed detection unit within a predetermined period.

The operation unit can be a rotation unit of a jog dial, for example. With such a configuration, since the playback speed control apparatus according to the present invention can either increase or decrease the playback speed according to the recursive pattern of the rotation speed detected by the rotation speed detection unit, a user operates the operation unit so that the rotation speed matches the predetermined recursive pattern when the playback position of the intended video or sound is far from the current playback position, whereby the intended video or sound is played at high speed. Alternatively, when the playback position of the intended video or sound is close to the current playback position, the user operates the operation unit normally, whereby the intended video or sound is played at normal playback speed. Thus, the intended playback position can be easily found regardless of the current playback position of the intended video or sound, that is, even if the intended playback position is far from or close to the current playback position, without impairing superior operability of the playback speed control apparatus such as a jog dial. Moreover, the operability can be improved as it is not necessary to move the user's hand or finger away from the playback speed control apparatus such as a jog dial. In addition, it is possible to prevent erroneous operation as the playback speed increases only when the playback speed control apparatus is operated at a specific recursive pattern.

Furthermore, in the above playback speed control apparatus, the control unit can increase the playback speed in a phased manner when the rotation speed detection unit detects a recursive pattern that includes rapid acceleration and gradual deceleration in the same direction within a predetermined period. It is assumed that the operation unit is the rotation unit of the jog dial, for example, and that an operation is performed in which a force is applied in a certain direction to the rotation unit of this jog dial such as by flicking with a finger, and then left uncontrolled (referred to as a "flicking operation"). The rotation unit increases the rotation speed when a rotational force is applied, and keeps rotating in the same direction for a while when left uncontrolled and will not stop immediately, since an inertia force is exerted. However, due to an effect such as of a frictional force between a rotation axis of the operation unit and a casing, the rotation speed of the operation unit is then gradually decreased. Although this is a mere example, a recursive pattern of the rotation speed can be easily generated by repeating such an operation. In the playback speed control apparatus according to the present invention, as the control unit can increase the playback speed when the recursive pattern detected based on the rotation speed includes rapid acceleration and gradual deceleration in the same direction, when the playback position of the intended video or sound is temporally far from the current playback position, it is possible to realize the playback at a desired high speed only by the user repeating a simple operation of rapidly accelerating the operation unit and then leaving uncontrolled in the same direction.

Moreover, in the above playback speed control apparatus, when the rotation speed detection unit detects the recursive pattern including rapid acceleration and gradual deceleration in the same direction, the control unit can change the playback speed according to an increase and a decrease of an interval of rapid acceleration and gradual deceleration. With such a configuration, as the user can further change the playback speed in the high speed playback only by increasing and decreasing the interval of rapid acceleration and gradual deceleration in addition to repeating the simple operation of rapidly accelerating the operation unit and then leaving uncontrolled in the same direction, the operability of the playback speed control apparatus such as the jog dial is further improved.

Furthermore, in the above playback speed control apparatus, when the rotation speed detection unit no longer detects the recursive pattern including rapid acceleration and gradual deceleration in the same direction, the control unit can return the playback speed to the normal playback speed. With such a configuration, since the user can switch from high speed playback to normal speed playback by a simple operation of stopping the operation of rapidly accelerating the operation unit and then leaving uncontrolled in the same direction, the operability of the playback speed control apparatus such as the jog dial is further improved.

According to a second aspect of the present invention, a playback speed control method is provided that controls playback speed according to rotation of an operation unit which is rotatable, the method including: a rotation speed detection step of detecting rotation speed of the operation unit; and a control step of controlling the playback speed according to the rotation speed detected in the rotation speed detection step, in which the control step has a step of either increasing or decreasing the playback speed according to a recursive pattern of the rotation speed detected in the rotation speed detection step within a predetermined period.

The target of an operation may be a rotation unit of a jog dial, for example. With such a configuration, since the playback speed control method according to the present invention can either increase or decrease the playback speed according to the recursive pattern of the rotation speed detected in the rotation speed detection step, an user operates so that the rotation speed matches the predetermined recursive pattern when the playback position of the intended video or sound is far from the current playback position, whereby the intended video or sound is played at high speed. Alternatively, when the playback position of the intended video or sound is close to the current playback position, the user operates normally, whereby the intended video or sound is played at normal playback speed. Thus, the intended playback position can be easily found regardless of the current playback position of the intended video or sound, without impairing operability of the playback speed control apparatus such as a jog dial. Moreover, the operability can be improved as it is not necessary to move the user's finger away from the playback speed control apparatus such as a jog dial. In addition, it is possible to prevent erroneous operation as the playback speed increases only when the playback speed control apparatus is operated at a specific recursive pattern.

According to a third aspect of the present invention, an operation speed control apparatus is provided that controls operation speed according to rotation of an operation unit which is rotatable, the apparatus including: a rotation speed detection unit that detects rotation speed of the operation unit; and a control unit that controls the operation speed according to the rotation speed detected by the rotation speed detection unit, in which the control unit either increases or decreases the operation speed according to a recursive pattern of the rotation speed detected by the rotation speed detection unit within a predetermined period.

With such a configuration, an intended slight operation can be controlled without impairing superior operability of the operation speed control apparatus such as a jog dial. Moreover, the operability can be improved as it is not necessary to move the user's hand or finger away from the operation speed control apparatus such as a jog dial. In addition, it is possible to prevent erroneous operation since the operation speed increases only when the operation speed control apparatus is operated at a specific recursive pattern.

Advantageous Effects of Invention

The present invention can provide a playback speed control apparatus and a playback speed control method, with which an intended playback position can be easily and rapidly found regardless of a playback position of intended video or sound in relation to a current position without impairing operability of a jog dial, while preventing erroneous operation.

DESCRIPTION OF EMBODIMENTS

Preferred embodiments of the present invention are described below with reference to the accompanying drawings.

Figure 1:
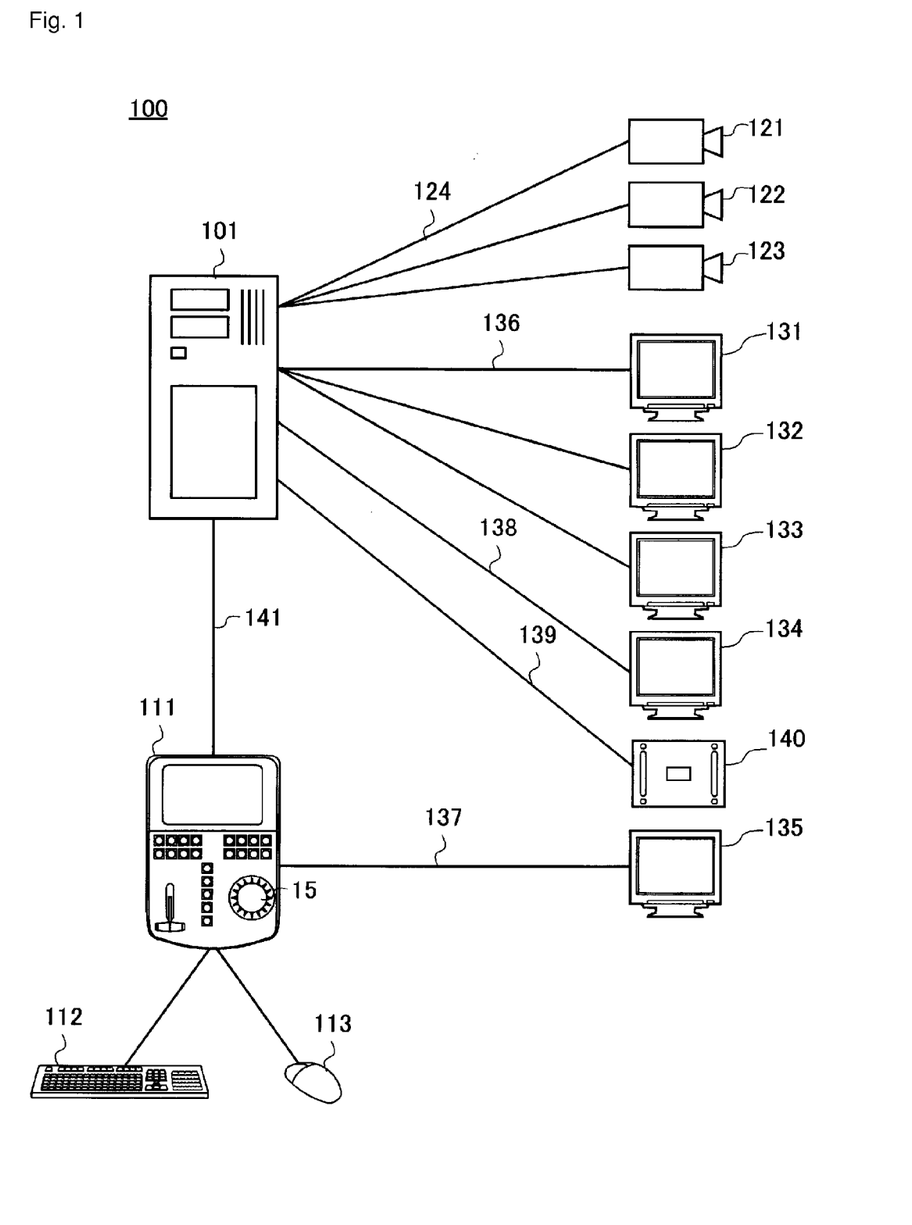
FIG. 1 is a schematic diagram of an information processing system including an embodiment of a playback speed control apparatus according to the present invention.

FIG. 1 is a schematic diagram of an information processing system including an embodiment of a playback speed control apparatus according to the present invention. The information processing system is configured, for example, as a moving image editing and recording system, and the playback speed control apparatus can be configured, for example, as a moving image editing apparatus. As shown in FIG. 1, the information processing system 100 is provided with an image server 101, the playback speed control apparatus 111, a keyboard 112, a mouse 113, cameras 121 to 123, camera monitors 131 to 133, a decoder monitor 134, a system monitor 135, and the like. Each of the components forming the information processing system 100 is connected using, for example, a LAN (Local Area Network) 141 to connect the image server 101 and the playback speed control apparatus 111, a coaxial cable 124 to connect the image server 101 and the cameras 121 to 123, a coaxial cable 136 to connect the image server 101 and the camera monitors 131 to 133, a VGA (Video Graphics Array) cable 138 to connect the image server 101 and the decoder monitor 134, a cable 137 to connect the playback speed control apparatus 111 and the system monitor 135, and a coaxial cable 139 to connect the image server 101 and a transmitter 140, etc. However, the method of connection is not limited thereto.

The image server 101 encodes the moving image signal received from, for example, three cameras 121 to 123, and stores the encoded signal as moving image data. Furthermore, the image server 101 decodes the moving image data into a moving image signal, and transfers the moving image signal to the decoder monitor 134. The decoder monitor 134 displays moving images based on the moving image signal received from the image server 101. The camera monitors 131 to 133 display the moving images captured by the cameras 121 to 123, or the like. Furthermore, the image server 101 transfers the moving image signal to the transmitter 140 for actual broadcasting.

The playback speed control apparatus 111 sends and receives via the image server 101 and the LAN 141, and displays a user interface on the display screen (shown in FIG. 2), based on the signal sent from the image server 101 and the user input. Furthermore, the playback speed control apparatus 111 converts a user's request that has been input by the mouse 113, by the keyboard 112 or by the playback speed control apparatus 111 itself to a signal, and sends the signal to the image server 101, or the like. In addition, the playback speed control apparatus 111 sends the signal for displaying the user interface to the system monitor 135 via the VGA cable 137.

The cameras 121 to 123 capture images of a target subject and output the images as a moving image signal of a predetermined format, which is sent to the image server 101 via the coaxial cable 124. The cameras 121 to 123 may take images of the same target subject from different angles, may take images from each of the imaging angles with different lenses, and may be configured of a combination of normal cameras and cameras capable of high-speed photography. Furthermore, the cameras 121 to 123 may take images of a different target subject. In many cases, the cameras are paired with microphones.

Figure 2:
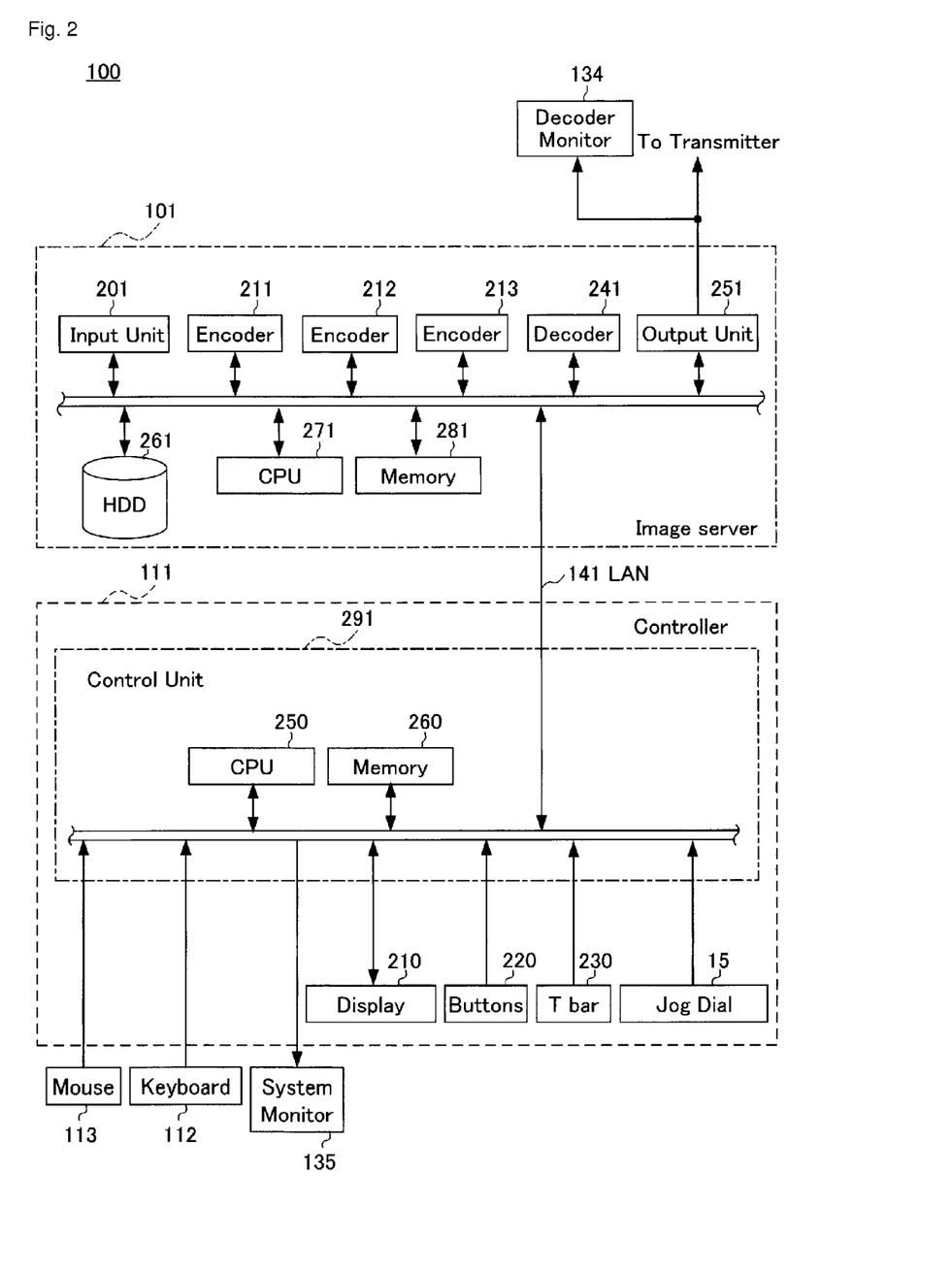
FIG. 2 is a block diagram of an embodiment of a playback speed control apparatus according to the present invention.

FIG. 2 is a block diagram of the information processing system according to the present embodiment. Referring to FIG. 2 along with FIG. 1, the information processing system 100 includes the image server 101, the playback speed control apparatus 111, a keyboard 112, a mouse 113, a system monitor 135, a decoder monitor 134, and the like. It should be noted that the image server 101 and the playback speed control apparatus 111 may be provided as a single integrated unit, although they are described as separate units.

The image server 101 includes an input unit 201, encoders 211 to 213, a decoder 241, an output unit 251, a hard disk drive 261, a CPU 271, a memory 281, and the like, in which components of these are respectively connected via a bus to enable communication.

The input unit 201 receives the moving image signal from the camera 121 to 123. It should be noted that the moving image signal that is input may be, for example, a moving image signal stored in a video recording apparatus such as a video tape recorder (VTR) or an optical disk device. The input unit 201 may receive moving image data that has been externally encoded, or may receive image data that has not been encoded.

The encoders 211 to 213 encode the moving image signal sent from the input unit 201 into encoded moving image data that includes time information as necessary. Furthermore, the encoders 211 to 213 may also read out and encode a moving image signal stored on the hard disk drive 261.

The decoder 241 reads out and decodes the encoded moving image data from the hard disk drive 261, and sends the moving image signal to the output unit 251 or the like. Furthermore, the decoder 241 and the hard disk drive 261 constitute a playback unit.

The output unit 251 receives the moving image signal that has been decoded from the decoder 241, and outputs the signal to the decoder monitor 134 and the transmitter 140. The output unit 251 outputs the moving image signal in a format compliant with a device that is connected thereto. For example, a VGA signal is output from the output unit 251 to the decoder monitor 134, and, for example, an HD-SDI signal is output from the output unit 251 to the transmitter 140. Furthermore, the output unit 251 may receive and output the moving image signal that has been read from the input unit 201 and the hard disk drive 261, or the encoded moving image data from the input unit 201 and the hard disk drive 261, or may receive the encoded moving image data from the encoders 211 to 213 and output the received encoded moving image data.

The hard disk drive (HDD) 261 stores programs that are to be executed by the CPU 271 and the encoded moving image data sent from the encoders 211 to 213. Furthermore, the hard disk drive 261 may directly store the moving signal sent from the input unit 201. The hard disk drive 261 may be provided inside or outside the image server 101, or both. Moreover, although the hard disk drive 261 is described for explanatory purposes in the present embodiment, any memory device, for example, large volume memory such as a tape drive, an optical disk drive, a semiconductor drive, or any combination thereof may be used other than a hard disk drive, as long as such a device is capable of storing moving image data or a moving image signal.

The CPU 271 reads out programs stored in the memory 281, and carries out various processing. Examples of the programs executed by the CPU 271 include applications for editing or playing back moving image data, an OS (Operating System) for controlling devices connected to the bus, and the like.

The memory 281 stores programs that have been read out from the hard disk drive (HDD) 261. The programs include, for example, applications for editing or playing back moving image data in response to an input and an output of the playback speed control apparatus 111, the OS for controlling the devices connected to the bus, and the like. Furthermore, the memory 281 may store moving image signals and moving image data from the devices connected to the bus.

The decoder monitor 134 is connected to the output unit 251, and displays a moving image based on the moving image signal, such as a VGA signal, sent from the output unit 251. Although the decoder monitor 134 is used to monitor the content of the moving image signal output in playback for broadcasting or when the moving images are played back at a playback speed being controlled, as will be described later, the decoder monitor 134 is not necessarily essential for the playback speed control apparatus 111. For example, the system monitor 135 may receive a moving image signal that has been decoded from the decoder 241 and display a moving image substantially the same as the moving image displayed on the decoder monitor 134, so that the user can control the playback speed of the moving image by operating the playback speed control apparatus 111 while watching the system monitor 135.

Furthermore, the playback speed control apparatus 111 is provided with a control unit 291, a built-in display 210 such as a touch panel, a button group 220, a T-bar 230, and a jog dial 15. However, the display 210, the button group 220, the T-bar 230, and the like, are not essential for the playback speed control apparatus 111.

The control unit 291 is provided with a CPU 250 and memory 260. The control unit 291 sends and receives a signal to and from the image server 101, sends a signal for displaying the user interface and the like on the display 210 and, if necessary, on the system monitor 135, and sends input data or a request command input via the button group 220, the T-bar 230, the jog dial 15, the keyboard 112, and the mouse 113 to the image server 101. Each button of the button group 220 serves as a switch that turns on and off whenever being pressed down. Each button of the button group 220 may emit light with different colors in conjunction therewith.

Figure 3:
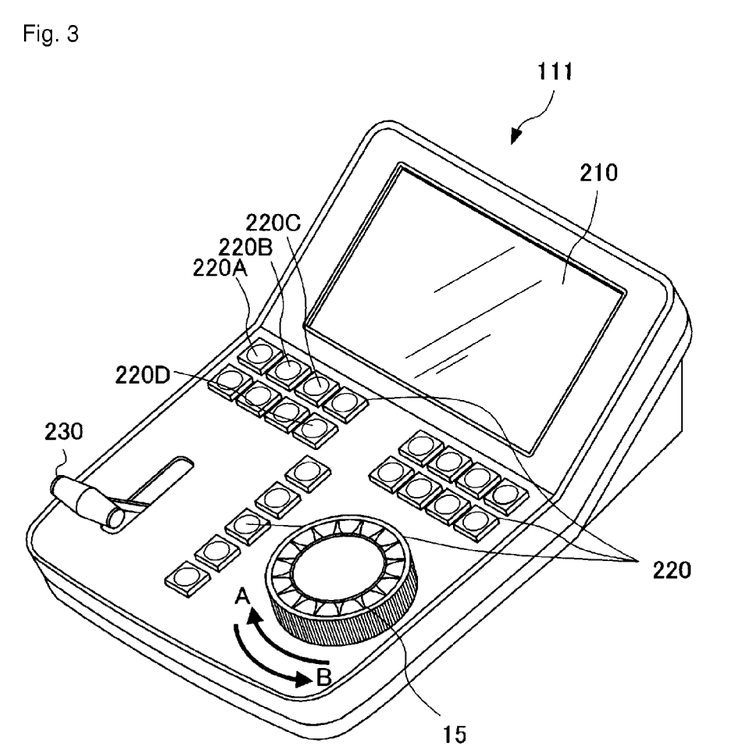
FIG. 3 is a perspective diagram of an embodiment of a playback speed control apparatus according to the present invention.

FIG. 3 is a perspective view of an outer shape of the playback speed control apparatus 111. Referring to FIG. 3 along with FIG. 2, the playback speed control apparatus 111 is provided with the display 210 on an upper portion thereof, the button group 220 arranged in arrays vertically and horizontally in a central area below the display 210, the T-bar 230 disposed in a lower left portion below the display 210 and operable by the user by tilting the bar in a longitudinal direction, and the jog dial 15 disposed in a lower right portion below the display 210 and operable by the user by rotating the dial horizontally. A layout of the components on the playback speed control apparatus 111 shown in FIG. 3 is for a mere illustration and is not limited thereto.

The display 210 displays the user interface in response to a user input and a signal sent from the image server 101. Furthermore, the display 210 may be a touch panel display capable of detecting touch operations by the user to the display screen and a position at which the user touched the display screen, and it is possible to input data or request commands through the touch panel.

The button group 220 sends a signal to the image server 101 in response to depressing thereof by the user. For example, selection buttons 220A-220C are buttons for selecting pieces of image data respectively captured by the cameras 121 to 123 to playback. By the user pressing down any of the selection buttons 220A-220C, a piece of moving image data corresponding to the selection buttons 220A-220C depressed (for example, clip A to clip C as will be described later) is selected, and the selected piece of moving image data is decoded by a decoder unit in playback operation, and displayed on the decoder monitor 134 or transmitted externally.

The T-bar 230 sends, to the image server 101, a signal corresponding to a tilt angle of the T-bar 230 that has been tilted from a reference angle by an operation of the user to tilt the T-bar 230 in the longitudinal direction, whereby a playback speed of moving images to be played back, that is, the moving images that are to be displayed on the decoder monitor 134, can be adjusted according to the degree of the angle of the T-bar 230.

The jog dial 15 sends, to the image server 101, a signal in accordance with a rotation speed of the jog dial 15 that is rotated horizontally with respect to a top surface of the jog dial by the user operation and a recursive pattern of the rotation speed. For example, as the rotation speed increases, the playback speed of the moving images (the playback speed of the moving images to be displayed on the decoder monitor 134 or the system monitor 135) becomes faster, and stopping the rotation stops the playback of the moving images. Furthermore, if the jog dial 15 is rotated in a the clockwise direction A, the playback is in a forward direction, and if the jog dial 15 is rotated in a counterclockwise direction B, the playback is in a backward direction. Next, a relation between the recursive pattern of the rotation speed of the jog dial 15 and the playback speed is described in detail.

Method of Generating Recursive Pattern of Rotation Speed

Figure 4:
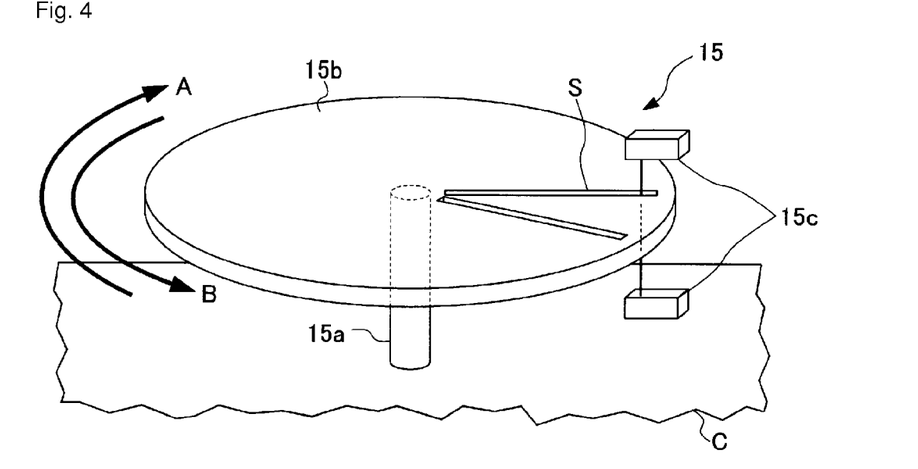
FIG. 4 is a schematic configuration diagram of a jog dial constituting the playback speed control apparatus shown in FIG. 3.

FIG. 4 is a schematic configurational view of the jog dial 15. As shown in FIG. 4, the jog dial 15 is provided with a rotation axis 15a that is fixed with respect to a casing (represented by C in FIG. 4), a rotation unit 15b that is rotatable horizontally in the clockwise direction A or the counterclockwise direction B around the rotation axis 15a, and a rotation speed detection unit 15c that detects a rotation speed of the rotation unit 15b, and the rotation unit 15b of the jog dial 15 is configured to rotate around the rotation axis 15a in the clockwise direction A in a case where the user operates by applying a force in the clockwise direction A, and in the counterclockwise direction B in a case where the user operates by applying a force in the counterclockwise direction B. The rotation speed detection unit 15c is electrically connected with the control unit 291, and the control unit 291 is configured so as to send and receive a signal to and from the rotation speed detection unit 15c, and constantly acquire the rotation speed of the rotation unit 15*b* and the recursive pattern of the rotation speed detected by the rotation speed detection unit 15*c*.

For example, the rotation unit 15*b* of the jog dial 15 can be provided with a disk-shaped slit plate having a number of slits S (not shown in the drawing), and the rotation speed detection unit 15*c* can be configured as a photo-interrupter in which the slit portions of the plate transmit or shield light. The photo-interrupter generates pulse currents, i.e. pulse signals, that are different from each other when the slit plate transmits light and when the slit plate shields light. The control unit 291 can detect the rotation speed and the recursive pattern of the rotation speed by counting the pulse signals at a predetermined time interval. Furthermore, the control unit 291 can be configured to identify a rotation direction based on two sets of pulse signals, by providing a slit plate with at least two sets of the slits S concentrically such that an angle differs by 90 degrees from each other. Moreover, the rotation speed detection unit 15*c* can detect the rotation speed of the rotation unit 15*b* by means of an optical, magnetic, or electrical method, other than the above described method.

In addition, when the user applies a force to the rotation unit 15*b* either in the clockwise direction A or in the counter-clockwise direction B and then leave uncontrolled, the rotation will not stop immediately since the inertia force is exerted, and the rotation unit 15*b* keeps rotating in the clockwise direction A or in the counter-clockwise direction B for a predetermined time period. However, due to such actions as a frictional force between the rotation axis 15*a* and the casing and such, the rotation speed of the rotation unit 15*b* is then decelerated, while rapidly accelerated when the user applies a force to the rotation axis 15*a*. The present invention is configured so that the recursive pattern of the rotation speed is generated and detected utilizing this principle.

Figure 5:
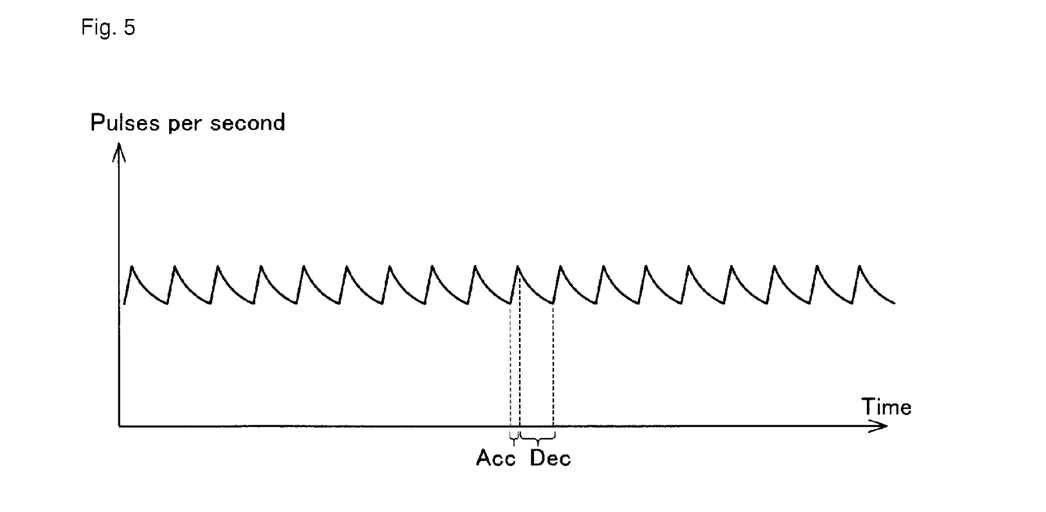
FIG. 5 is a waveform graph representing a recursive pattern that is generated when a "flicking operation" is carried out on the jog dial shown in FIG. 4.

FIG. 5 shows a recursive pattern of the rotation speed of the rotation unit 15*b* detected by the rotation speed detection unit 15*c* when the user repeats an operation of applying a force to the rotation unit 15*b* of the jog dial 15 in a certain direction such as flicking by finger and leaves the rotation unit 15*b* uncontrolled (hereinafter referred to as a "flicking operation" of the jog dial). The vertical axis of FIG. 5 indicates the number of pulse signals per time unit that the rotation speed detection unit 15*c* generates according to the rotation of the rotation unit 15*b*, and the horizontal axis indicates elapsed time. From FIG. 5, it can be seen that a waveform is formed by a combination of a rapid acceleration section represented by "Acc" in which the rotation of the rotation unit 15*b* is rapidly accelerated, and a deceleration section represented by "Dec" in which the rotation of the rotation unit 15*b* is gradually decelerated.

Figure 6:
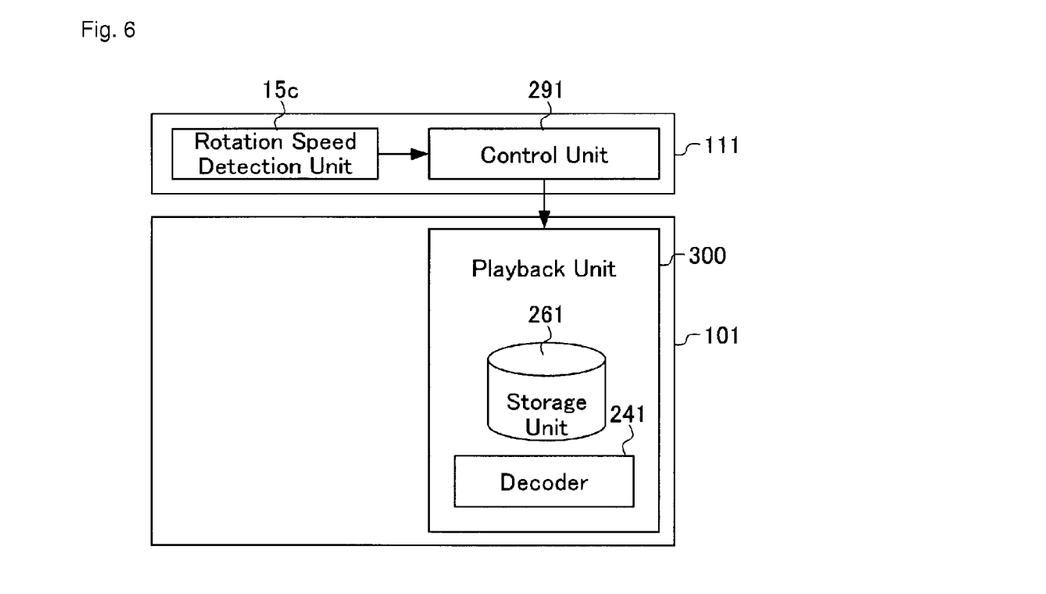
FIG. 6 is a functional configuration diagram of an embodiment of a playback speed control apparatus according to the present invention.

FIG. 6 shows a functional configuration diagram of one embodiment of the playback speed control apparatus according to the present invention. Referring to FIG. 6 along with FIG. 2, the playback speed control apparatus 111 is provided with the rotation speed detection unit 15*c* and the control unit 291 by the components shown in FIG. 2 to FIG. 4 working in cooperation with related programs. Furthermore, as described above, the moving image server 101 includes a storage unit (hard disk drive) 261 in which the image data is recorded as well as the decoder 241, and plays intended moving images in response to a playback control signal from the playback speed control apparatus 111. By each of these means, the control unit 291 realizes functions of (1) normal playback of the moving image data and (2) high speed playback of the moving image data. The following describes the functions of the playback speed control apparatus.

(1) Function of Normal Playback of Moving Image Data

The control unit 291 controls the playback speed of the moving image server 101 according to the rotation speed detected by the rotation speed detection unit 15*c*. With this, since playback at a normal playback speed is possible when the playback position of the intended video or sound is close to the current playback position, it is possible to search the desired playback position easily while maintaining highly intuitive operability of the jog dial 15.

(2) Function of High Speed Playback of Moving Image Data

The control unit 291 increases the playback speed according to the recursive pattern of the rotation speed detected by the rotation speed detection unit 15*c*. With this, since playback at a high speed is possible only by operating the rotation unit 15*b* of the jog dial 15 when the playback position of the intended video or sound is temporally far from the current playback position, it is possible to search the desired playback position easily while maintaining highly intuitive operability of the jog dial 15.

Figure 7:
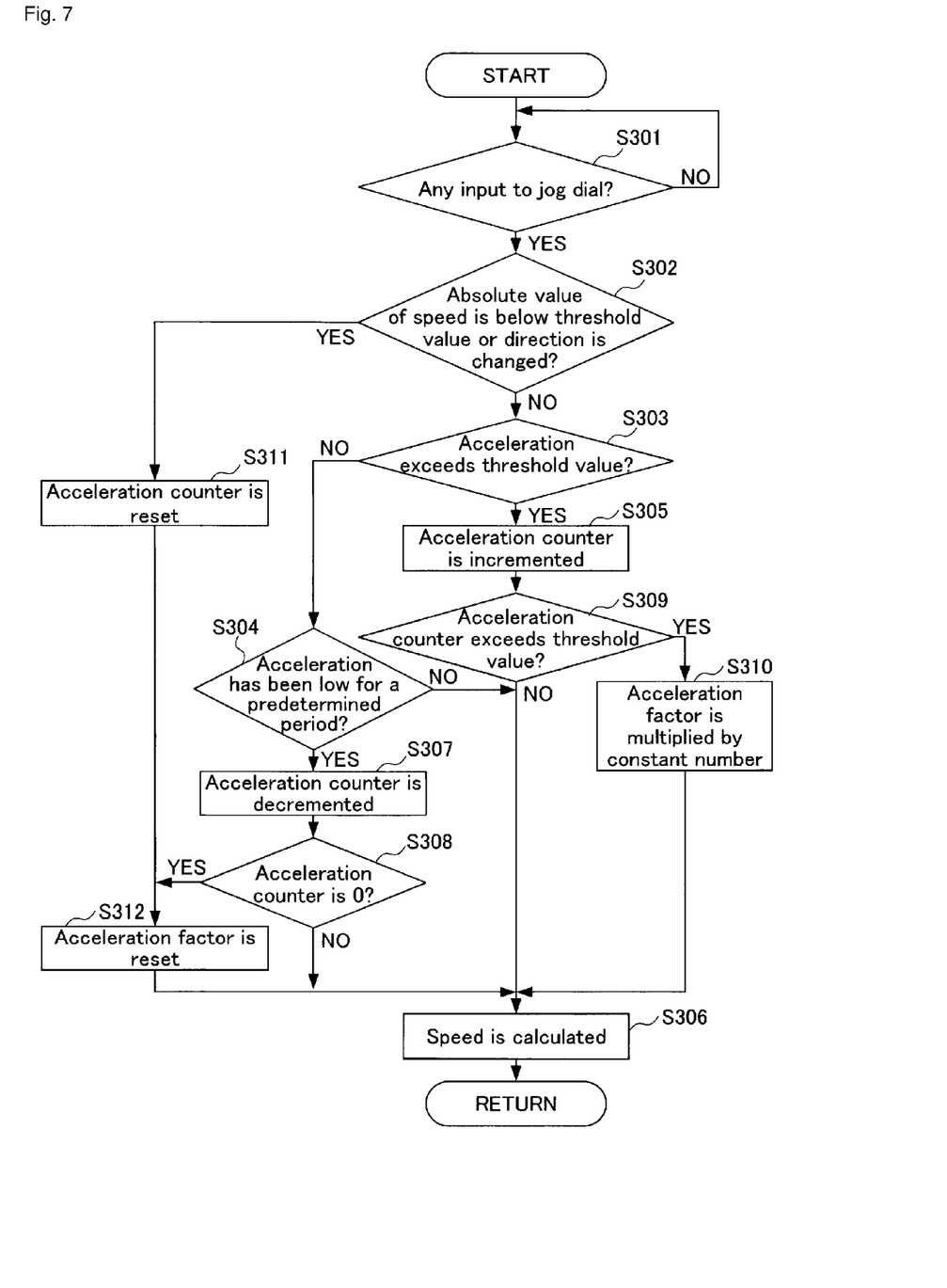
FIG. 7 is a flowchart of an embodiment of a playback speed control method according to the present invention.
Figure 8:
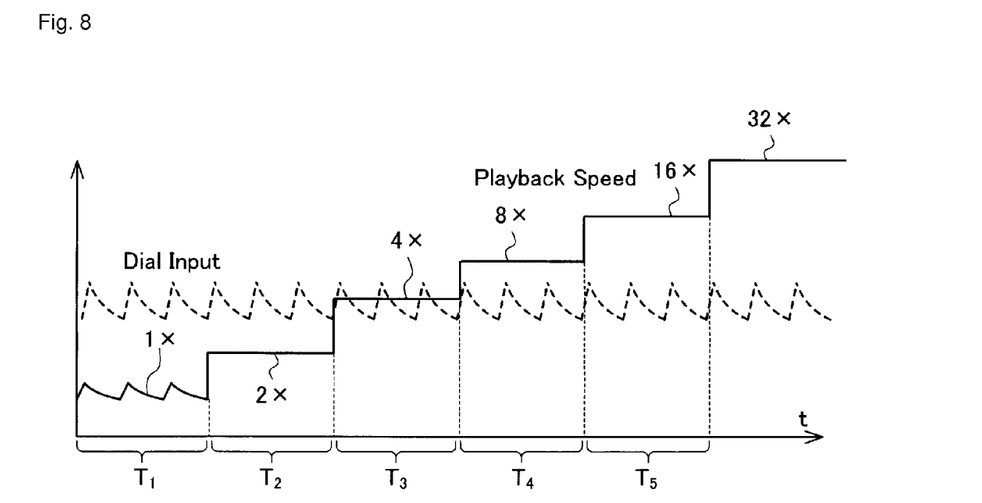
FIG. 8 is a diagram illustrating a process of increasing playback speed by the playback speed control method shown in FIG. 7.
Figure 9:
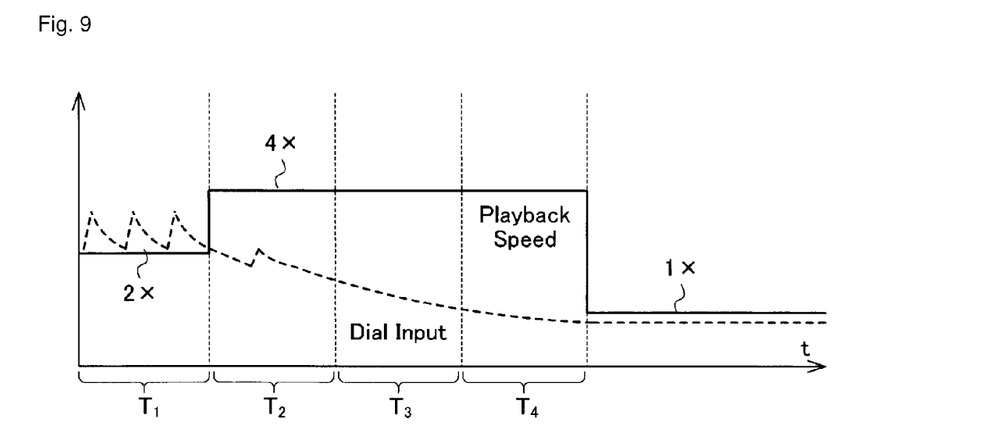
FIG. 9 is a diagram illustrating a process of decreasing playback speed by the playback speed control method shown in FIG. 7.

FIG. 7 is a flowchart of one embodiment of a playback speed control method according to the present invention. FIG. 8 is an illustrative diagram for explaining a process in which the playback speed increases according to the present embodiment of the playback speed control method, and FIG. 9 shows an illustrative diagram for explaining a process in which the playback speed decreases according to the present embodiment of the playback speed control method. The following describes the present embodiment of the playback speed control method, referring to FIG. 7 to FIG. 9 in addition to FIG. 4 to FIG. 6. In the present embodiment, an acceleration factor and an acceleration counter are recorded in the memory 260 in the control unit 291. Here, the "acceleration factor" represents a speed multiple multiplied when calculating the playback speed, and is, for example, 1 time, 2 times, 4 times, 8 times, 16 times, 32 times, or the like. The acceleration counter will be described later in detail.

In Step S301, the control unit 291 judges whether or not an input to the jog dial 15 has been made. More specifically, the control unit 291 judges whether or not there has been an input to operate the rotation unit 15*b*, based on the pulse signal sent from the rotation speed detection unit 15*c*. The control unit 291 also determines a rapid change in the pulse signal as an input by operation of the rotation unit 15*b* by the user, in addition to the presence of the pulse signal from the rotation speed detection unit 15*c*. In a case where it is judged that an input has been made, the process proceeds to Step S302, and in a case where it is judged that an input has not been made, the process returns to Step S301 and repeats the same step. Furthermore, in determining the presence of an input from the jog dial in S301, a threshold value may be provided in order to prevent a false operation and the like.

In Step S302, the control unit 291 judges whether an absolute value of the rotation speed of the rotation unit 15*b* is below a predetermined value or not, or whether there has been an input by an operation to change a rotation direction of the rotation unit 15*b*. More specifically, the control unit 291 judges whether the absolute value of the rotation speed of the rotation unit 15*b* is below the predetermined value or not, or whether there has been an operation to change the rotation direction of the rotation unit 15*b*, based on the pulse signal from the rotation speed detection unit 15*c*. In a case where it is judged that the absolute value of the rotation speed of the rotation unit 15*b* is not below the predetermined value, or that there has not been an input by an operation to change the rotation direction of the rotation unit 15*b*, the process proceeds to Step S303. In a case where it is judged that the absolute value of the rotation speed of the rotation unit 15*b* is below the predetermined value, or that there has been an input by an operation to change the rotation direction of the rotation unit 15b, the process proceeds to Step S311.

In Step S303, the control unit 291 judges whether or not acceleration of the rotation of the rotation unit 15b is over a predetermined threshold value (the threshold value of acceleration). More specifically, the control unit 291 calculates the acceleration of the rotation of the rotation unit 15b based on the pulse signal from the rotation speed detection unit 15c, and judges whether or not the calculated acceleration is over the predetermined threshold value. As the threshold value, for example, a slope of rapid acceleration represented by Acc in FIG. 5 that can be generated by the flicking operation can be used. In a case where the control unit 291 judges that the acceleration of the rotation of the rotation unit 15b is not over the predetermined threshold value, the process proceeds to Step S304, and in a case where it is judged that the acceleration of the rotation of the rotation unit 15b is over the predetermined threshold value, the process proceeds to Step S305.

In Step S305, the control unit 291 increments a count of the acceleration counter in the memory 260 by 1.

In Step S309, the control unit 291 judges whether or not the count of the acceleration counter is over the predetermined threshold value. In a case where the control unit 291 judges that the count of the acceleration counter is over the predetermined threshold value (the threshold value of the acceleration counter), the process proceeds to Step S310, and in a case where it is judged that the count of the acceleration counter is not over the predetermined threshold value, the process proceeds to Step S306. In Step S310, the control unit 291 multiplies the acceleration factor by a constant number. As will be described in detail, in the present embodiment, it is assumed that the threshold value of the acceleration counter is 3, and the constant number multiplied to the acceleration factor is 2.

In Step S304, the control unit 291 judges whether or not the acceleration of the rotation of the rotation unit 15b has been below the predetermined threshold value for a certain time period. More specifically, the control unit 291 calculates the acceleration of the rotation of the rotation unit 15b based on the pulse signal from the rotation speed detection unit 15c, and judges whether or not the calculated acceleration has been below the predetermined threshold value for the certain period, that is, in the case of the present embodiment, at least a period consisting of at least three of time periods represented by T1, T2, T3, T4, and T5 in FIG. 8 or in FIG. 9. In a case where it is judged that the acceleration has not been below the predetermined threshold value, the process proceeds to Step S306, and in a case where it is judged that the acceleration has been below the predetermined threshold value, the process proceeds to Step S307.

In Step S307, the control unit 291 decrements the count of the acceleration counter in the memory 260 by 1.

In Step S308, the control unit 291 judges whether or not the acceleration count in the memory 260 is 0. In a case where it is judged that the acceleration count is not 0, the process proceeds to Step S306, and in a case where it is judged that the acceleration count is 0, the process proceeds to Step S312.

In Step S311, the control unit 291 resets the acceleration counter. More specifically, the control unit 291 sets the count of the acceleration counter in the memory 260 to be 0. In Step S312, the control unit 291 resets the acceleration factor. More specifically, the control unit 291 sets the acceleration factor in the memory 260 to be 1.

In Step S306, the control unit 291 determines the playback speed by multiplying the rotation speed of the rotation unit 15b by the acceleration factor. As has already been described, the acceleration factor is a coefficient that is multiplied with the normal playback speed when calculating the playback speed. More specifically, the acceleration factor represents a multiple of the playback speed for the normal playback, and is preferably, for example, 1, 2, 4, or 8. If the acceleration factor that is currently recorded in the memory 260 is 1, the playback speed is the speed for normal playback. Furthermore, when the rotation unit 15b stops, that is, the rotation speed of the rotation unit 15b is 0, the playback speed is zero. When the rotation direction of the rotation unit 15b changes, the playback speed is the speed for the normal playback, but the playback direction is opposite.

FIG. 8 is an illustrative diagram for explaining the process in which the playback speed increases according to the present embodiment of the playback speed control method, and a dashed line represents a fluctuation of the rotation speed of the rotation unit 15b that is detected by the rotation speed detection unit 15c and is substantially the same as a fluctuation shown in FIG. 5, with a solid line representing the playback speed of a playback unit 300. Referring to FIG. 8, it can be seen that the playback speed makes a two-fold increase from the normal playback speed (1×) to double speed (2×), quad speed (4×), eight speed (8×), and sixteen speed (16×), every three "flicking operations" to the rotation unit 15b made by the user during a predetermined period, in the present embodiment within the time periods represented by T1, T2, T3, T4, and T5. Although the explanation in FIG. 8 is given taking an example in which the playback speed increases at a multiple of 2, the playback speed can increase at a multiple of a number other than 2.

FIG. 9 is an illustrative diagram for explaining the process in which the playback speed decreases according to the present embodiment of the playback speed control method, and a dashed line represents a fluctuation of the rotation speed of the rotation unit 15b that is detected by the rotation speed detection unit 15c and is substantially the same as the fluctuation shown in FIG. 5, with a solid line representing the playback speed of a playback unit 300. Referring to FIG. 9, although it can be seen that the playback speed makes a two-fold increase from the double speed (2×) to the quad speed (4×) by the user making three "flicking operations" to the rotation unit 15b within a first predetermined period, that is, within the time period of T1, thereafter, since the "flicking operation" is not detected during subsequent three predetermined periods, that is, in T2, T3, and T4, the playback speed returns to the speed (1×) of the normal playback after the time period T4 elapses.

According to the operation described referring to FIG. 9, it is possible to promptly stop the playback of the images as needed.

For example, although the acceleration factor is reset to 1 in Step S312 in a case where the acceleration counter is judged to be 0 in Step S308 of FIG. 7, the acceleration factor may be decreased in a phased manner, for example, by dividing by 2, such as from eight speed to quad speed, quad speed to double speed, and double speed to normal speed.

In addition, although a configuration is made in which, in a case where it is judged that the acceleration of the rotation of the rotation unit 15b is over the predetermined threshold value in Step S303, the acceleration counter is incremented by 1 in Step S305, and the playback speed is increased in a case where the acceleration counter is over the predetermined threshold value such as 3 in Step S309, the present invention is not limited thereto. For example, the threshold value of the acceleration counter can be smaller than or greater than 3. Making the threshold value of the acceleration counter smaller causes the flicking operation to instantly affect the increase and decrease of the playback speed, and making the threshold value of the acceleration counter greater causes the flicking operation to affect the increase and decrease of the playback speed moderately. Additionally, the period judged in Step S304 during which the acceleration of the rotation of the rotation unit 15b is below the predetermined threshold value can also be adjustable according to various applications. Making the period judged in Step S304 during which the acceleration of the rotation of the rotation unit 15b is below the predetermined threshold value shorter can decrease a period after which the playback speed returns to the normal speed after the flicking operation, and making the period during which the acceleration of the rotation of the rotation unit 15b is below the predetermined threshold value longer can increase the period after which the playback speed returns to the normal speed after the flicking operation.

Furthermore, the playback speed control apparatus according to the present invention can be applied to not only devices that relate to adjustment of the playback speed for, in addition to the jog dial for editing moving images, game machines, cell phones, personal digital assistance (PDA), memory audio player, information appliances, television sets, car navigation systems, and such, but also to any device that relates to adjustment of an operation speed, such as controlling the operation speed of machine tools and robots. Employing the present invention to control the operation speed allows for control of a slight operation because of its highly intuitive operability. It should be evident that the rotation speed detection unit can also be realized using various techniques such as a switch or an encoder using variable resistance, in addition to the photo-interrupter.

As described above, since the playback speed control apparatus according to the present invention can either increase or decrease the playback speed according to the recursive pattern of the rotation speed detected by the rotation speed detection unit, the user operates the operation unit so that the rotation speed matches the predetermined recursive pattern in a case where the playback position of the intended video or sound is far from the current playback position, whereby the intended video or sound is played at high speed. Alternatively, in a case where the playback position of the intended video or sound is close to the current playback position, the user operates the operation unit normally, whereby the intended video or sound is played at normal playback speed. Thus, the intended playback position can be easily found regardless of the current playback position of the intended video or sound, without impairing operability of the playback speed control apparatus such as a jog dial. Moreover, the operability can be improved as it is not necessary to move the user's finger away from the playback speed control apparatus such as a jog dial. In addition, it is possible to prevent erroneous operation since the playback speed increases only when the playback speed control apparatus is operated at a specific recursive pattern.

While one embodiment according to the present invention is explained above, it should be noted that the present invention is not limited to the above embodiment. The effects described in the embodiment are merely examples of the most preferable effects of the present invention, and the effects of the present invention are not limited thereto.

REFERENCE SIGNS LIST

111 Playback speed control apparatus
15a Rotation axis
15b Rotation unit
15c Rotation speed detection unit
100 Information processing system
101 Image server
112 Keyboard
113 Mouse
135 System monitor
241 Decoder
260 Memory
261 Storage unit (hard disk)
291 Control unit
300 Playback unit

The invention claimed is:

1. A playback speed control apparatus that controls playback speed of data retrieved from a recording medium according to a detected rotation of a rotatable jog dial, the apparatus comprising:
a rotation speed detection unit that detects a rotation speed of the jog dial to determine periods of acceleration and deceleration of the rotation of the jog dial; and
a control unit that controls a relationship of the playback speed to the rotation speed detected by the rotation speed detection unit,
wherein the control unit increases the relationship of the playback speed to the rotation speed of the jog dial when the rotation speed detection unit detects a recursive pattern that includes cycles of short acceleration followed by longer deceleration in the same direction within a predetermined period and returns the playback speed to a normal playback speed when the rotation speed detection unit no longer detects the recursive pattern including short acceleration and longer deceleration in the same direction within a predetermined period.

2. The playback speed control apparatus according to claim 1, wherein the control unit changes the playback speed according to an increase and a decrease of an interval of short acceleration and longer deceleration, when the rotation speed detection unit detects a recursive pattern including short acceleration and longer deceleration in the same direction within a predetermined period.

3. The playback speed control apparatus of claim 1, wherein the control unit incrementally increases the relationship of the playback speed to the detected rotation speed each time a predetermined number of cycles of the recursive pattern occur within the first predetermined period of time.

4. The playback speed control apparatus of claim 3, wherein the relationship is incremented when three cycles of the recursive pattern occur within the first predetermined period of time.

5. The playback speed control apparatus of claim 3, wherein the relationship of the playback speed to the rotation speed doubles each time the predetermined number of cycles of the recursive pattern occur within the first predetermined period of time.

6. The playback speed control apparatus of claim 1, wherein the jog dial comprises a jog dial provided with a disk shaped slit plate, and wherein the rotation speed detection unit comprises a photo-interrupter.

7. A playback speed control method for controlling playback speed of data retrieved from a recording medium according to a detected rotation of a rotatable jog dial, the method comprising:
detecting rotation speed of the jog dial to determine periods of acceleration and deceleration of rotation of the jog dial; and
controlling a relationship of the playback speed to the detected rotation speed of the jog dial;
analyzing the detected rotation speed to determine the occurrence of recursive patterns of short acceleration followed by longer deceleration in the same direction;

determining whether the number of such recursive patterns occurring in a first predetermined period exceeds a given threshold;

increasing the relationship of the playback speed to the rotation speed of the jog dial when the number of such recursive patterns occurring in the first predetermined period exceeds the given threshold; and returning the relationship of the playback speed to the rotation speed of the jog dial to a normal playback speed, when no such recursive patterns are detected within a second predetermined period.

8. The playback speed control method according to claim 7, further comprising:

changing the playback speed according to an increase and a decrease of an interval of short acceleration and longer deceleration, when a recursive pattern including short acceleration and longer deceleration in the same direction is detected within a predetermined period.

9. The playback speed control method of claim 7, further comprising:

incrementally increasing the relationship of the playback speed to the detected rotation speed each time a predetermined number of cycles of the recursive pattern occur within the first predetermined period of time.

10. The playback speed control method of claim 9, wherein the relationship is incremented when three cycles of the recursive pattern occur within the first predetermined period of time.

11. The playback speed control method of claim 9, wherein the relationship of the playback speed to the rotation speed doubles each time the predetermined number of cycles of the recursive pattern occur within the first predetermined period of time.

12. An operation speed control apparatus that controls an operation speed according to rotation of a rotatable jog dial, the apparatus comprising:

a rotation speed detection unit that detects a rotation speed of the jog dial to determine periods of acceleration and deceleration of the rotation of the jog dial; and a control unit that controls a relationship of the operation speed according to the rotation speed detected by the rotation speed detection unit, wherein the control unit increases the relationship of the operation speed to the rotation speed when the rotation speed detection unit detects a recursive pattern that includes cycles of short acceleration followed by longer deceleration in the same direction within a first predetermined period and returns the playback speed to a normal playback speed when the rotation speed detection unit no longer detects the recursive pattern including short acceleration and longer deceleration in the same direction within a second predetermined period.

* * * * *